United States Patent
Koshikiya et al.

(10) Patent No.: US 11,112,332 B2
(45) Date of Patent: Sep. 7, 2021

(54) OPTICAL FIBER MONITORING METHOD, AND OPTICAL FIBER MONITORING SYSTEM

(71) Applicant: NIPPON TELEGRAPH AND TELEPHONE CORPORATION, Tokyo (JP)

(72) Inventors: Yusuke Koshikiya, Musashino (JP); Atsushi Nakamura, Musashino (JP); Kazutaka Noto, Musashino (JP); Tetsuya Manabe, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 0 days.

(21) Appl. No.: 16/977,882

(22) PCT Filed: Mar. 5, 2019

(86) PCT No.: PCT/JP2019/008694
§ 371 (c)(1),
(2) Date: Sep. 3, 2020

(87) PCT Pub. No.: WO2019/172276
PCT Pub. Date: Sep. 12, 2019

(65) Prior Publication Data
US 2021/0003474 A1 Jan. 7, 2021

(30) Foreign Application Priority Data
Mar. 6, 2018 (JP) .............................. JP2018-040117

(51) Int. Cl.
*G01M 11/00* (2006.01)
*H04B 10/071* (2013.01)
*G01D 5/353* (2006.01)

(52) U.S. Cl.
CPC ..... *G01M 11/3145* (2013.01); *G01D 5/35358* (2013.01); *G01D 5/35364* (2013.01);
(Continued)

(58) Field of Classification Search
CPC .. G01M 11/08; G01M 11/083; G01M 11/085; G01M 11/086; G01M 11/088;
(Continued)

(56) References Cited

U.S. PATENT DOCUMENTS

| 5,528,356 | A  | * | 6/1996 | Harcourt | G01M 11/3136 |
|           |    |   |        |          | 356/73.1     |
| 7,536,102 | B1 | * | 5/2009 | Huffman  | H04B 10/071  |
|           |    |   |        |          | 398/13       |

(Continued)

OTHER PUBLICATIONS

Tsunekazu Watanabe, Yoshitaka Enomoto, Yutaka Ozawa. "Light path test system using fiber Selector for small-scale building." NTT Technical Journal, vol. 20, No. 12 (2008). Machine translation attached.

(Continued)

*Primary Examiner* — Gordon J Stock, Jr.

(57) ABSTRACT

An object of the present disclosure is to provide an optical fiber cable monitoring method and an optical fiber cable monitoring system capable of linking information obtained from a measurement result with information stored in a DB and accurately specifying a loss occurrence location on an optical fiber cable. The optical fiber cable monitoring method according to the present disclosure uses two types of optical fiber measurement techniques having different sensitivities. Each of closure locations on the optical fiber cable is acquired with a high-sensitivity measurement technique, and geographical location information and the closure locations on the optical fiber are linked in an arrangement order of the closures. Thus, an operator can recognize an actual location (geographical location information) of a closure (Continued)

that is linked to a location of a point of abnormality on the optical fiber cable when an abnormality in the closure is detected with a low-sensitivity measurement technique.

6 Claims, 9 Drawing Sheets

(52) U.S. Cl.
CPC .... *G01M 11/3109* (2013.01); *G01M 11/3127* (2013.01); *G01M 11/3172* (2013.01); *H04B 10/071* (2013.01)

(58) Field of Classification Search
CPC .. G01M 11/30; G01M 11/31; G01M 11/3109; G01M 11/3118; G01M 11/3127; G01M 11/3136; G01M 11/3145; G01M 11/3154; G01M 11/3163; G01M 11/3172; G01M 11/3181; G01M 11/319; G01M 11/33; G01M 11/331; G01M 11/332; G01M 11/333; G01M 11/334; G01M 11/335; G01M 11/336; G01M 11/337; G01M 11/338; G01M 5/0008; G01M 5/0016; G01M 5/0025; G01M 5/0033; G01M 5/0041; G01M 5/0091; G01M 3/38; G01H 9/002; G01H 9/004; G01H 9/006; G01R 31/08; G01R 31/081; G01R 31/083; G01R 31/086; G01R 31/11; G05D 1/021; G05D 2201/02; H04B 10/03; H04B 10/032; H04B 10/034; H04B 10/038; H04B 10/07; H04B 10/071; H04B 10/072; H04B 10/0731; H04B 10/075; H04B 10/077; H04B 10/0771; H04B 10/079; H04B 10/0791; H04B 10/25753; H04B 10/27; H04B 10/40; G02B 6/4463; G02B 6/4467; G02B 6/4469; G02B 6/447; G01L 1/24; G01L 1/242; G01D 5/353; G01D 5/35338; G01D 5/35341; G01D 5/35345; G01D 5/35348; G01D 5/35351; G01D 5/35354; G01D 5/35358; G01D 5/35361; G01D 5/35364; G01D 5/35367; G01D 5/3537; G01D 5/34374
See application file for complete search history.

(56) References Cited

U.S. PATENT DOCUMENTS

| 10,075,232 | B1* | 9/2018 | Salgueiro | H04B 10/071 |
| 2009/0132183 | A1* | 5/2009 | Hartog | G01K 1/143 |
| | | | | 702/42 |
| 2010/0014071 | A1* | 1/2010 | Hartog | G01D 5/35361 |
| | | | | 356/73.1 |
| 2019/0197846 | A1* | 6/2019 | Englund | G08B 13/186 |
| 2019/0317239 | A1* | 10/2019 | Olsson | G01C 21/32 |
| 2020/0124735 | A1* | 4/2020 | Huang | G01V 1/001 |
| 2020/0191613 | A1* | 6/2020 | Englund | G08B 13/1672 |
| 2020/0313763 | A1* | 10/2020 | Wang | G01M 11/083 |

OTHER PUBLICATIONS

Nakamura Atsushi, Okamoto Keiji, Koshikiya Yusuke, Hanzawa Nobutomo, Katayama Kazunori, Manabe Tetsuya. "Highly sensitive detection of fiber bending using 1-pm-band mode detection OTDR." The Institute of Electronics, Information and Communication Engineers of Japan, vol. 114, No. 196 (2014). Machine translation attached.

Hiroshige Ohno, Hiroshi Naruse, Mitsuru Kihara, Akiyoshi Shimada. "Industrial Applications of the BOTDR Optical Fiber Strain Sensor." Optical Fiber Technology, vol. 7 (2001), pp. 45-64.

Tsuneo Horiguchi, Mitsuhiro Tateda. "BOTDA-nondestructive measurement of single-mode optical fiber attenuation characteristics using Brillouin interaction: theory." Journal of lightwave technology, vol. 7, No. 8 (1989), pp. 1170-1176.

* cited by examiner

| CLOSURE | DISTANCE INFORMATION (SPAN LENGTH) | DISTANCE INFORMATION (ACTUAL LENGTH) | GEOGRAPHICAL LOCATION INFORMATION (SUCH AS GPS OR ADDRESS INFORMATION) |
|---|---|---|---|
| A | 100 m | 160 m | 30.xxxx<br>140.xxxx |
| B | 240 m | 300 m | 30.yyyy<br>140.yyyy |
| C | 300 m | 360 m | 30.zzzz<br>140.zzzz |

OPTICAL FIBER MONITORING METHOD, AND OPTICAL FIBER MONITORING SYSTEM

CROSS-REFERENCE TO RELATED APPLICATIONS

This application is a 371 U.S. National Phase of International Application No. PCT/JP2019/008694, filed on Mar. 5, 2019, which claims priority to Japanese Application No. 2018-040117 filed on Mar. 6, 2018.

TECHNICAL FIELD

The present disclosure relates to an optical fiber cable monitoring method and an optical fiber cable monitoring system for monitoring the state of an optical fiber cable.

BACKGROUND ART

Figure 1:
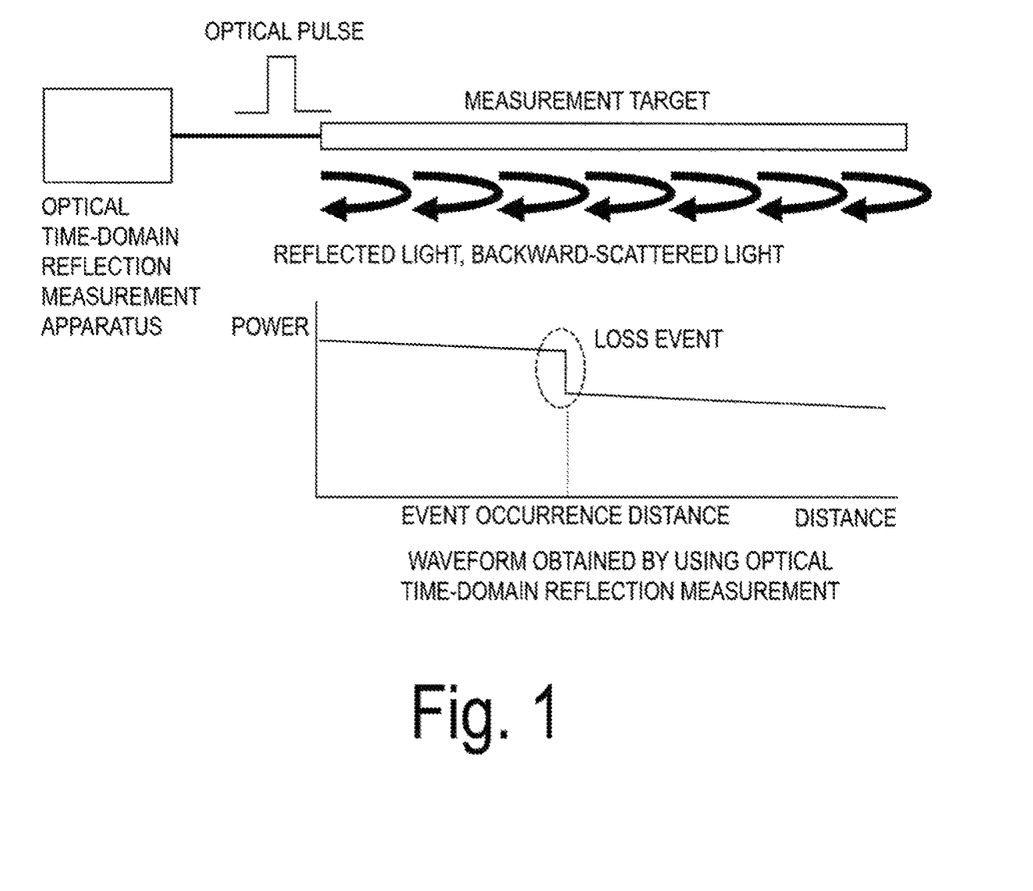
FIG. 1 is a diagram schematically illustrating an optical time-domain reflection measurement method.

As illustrated in FIG. 1, the optical time-domain reflection measurement method is a technique for finding a distribution of a loss in a length direction of a measurement target by observing power on a time axis when reflected light and backward-scattered light generated within the measurement target by an optical pulse that is incident on one end of the measurement target, returns to the incident end. The optical fiber cable is installed over a long distance such as several kilometers or more, which makes remote monitoring necessary, and the monitoring is performed by remotely finding a state, particularly a distribution of loss, by using the optical time-domain reflection measurement method utilizing a communication wavelength bandwidth (O bandwidth to U bandwidth) as a test wavelength. That is, a loss value or changes of the loss value and their occurrence distance can be detected, and therefore, it is possible to know approximate distance of where a loss event occurred from one end of an optical fiber.

Figure 2:
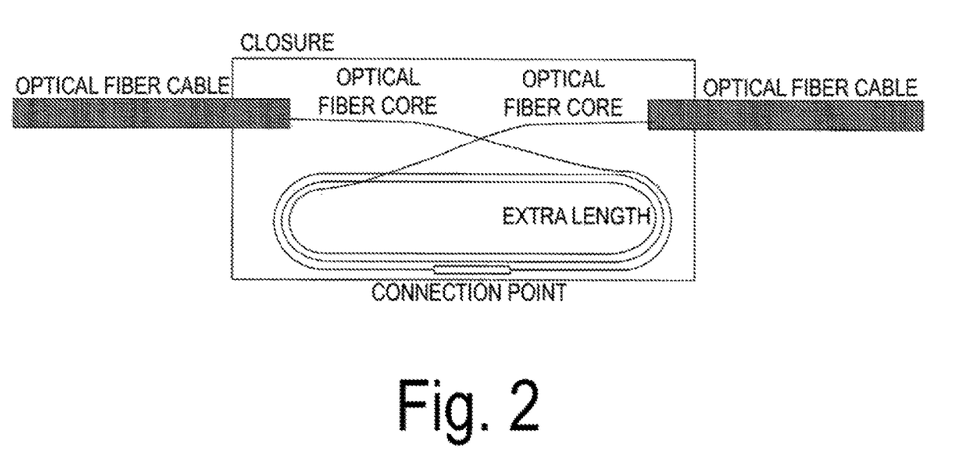
FIG. 2 is a diagram schematically illustrating a closure accommodating a connection point and an extra length of an optical fiber cable.

The optical fiber cable is installed over a long distance, and thus a route is constructed by connecting a plurality of optical fiber cables. Connection work is performed in a manhole, during which the optical fiber cable which serves to protect an optical fiber core is stripped, and the optical fiber core is in an exposed state as the connection work is performed. The strength and reliability of the connection point of the optical fiber cable are reduced due to the peeling of a protection member, and thus it is accommodated in a box called a closure as illustrated in FIG. 2 after the connection work. Also, the optical fiber core is drawn out of the optical fiber cable so as to secure a certain margin (extra length) to facilitate the connection work, and thus when the connection point is accommodated in the closure, the extra length of the optical fiber core is also contained in the closure in a circular or elliptical shape so as not to cause sharp bending.

Figure 3:
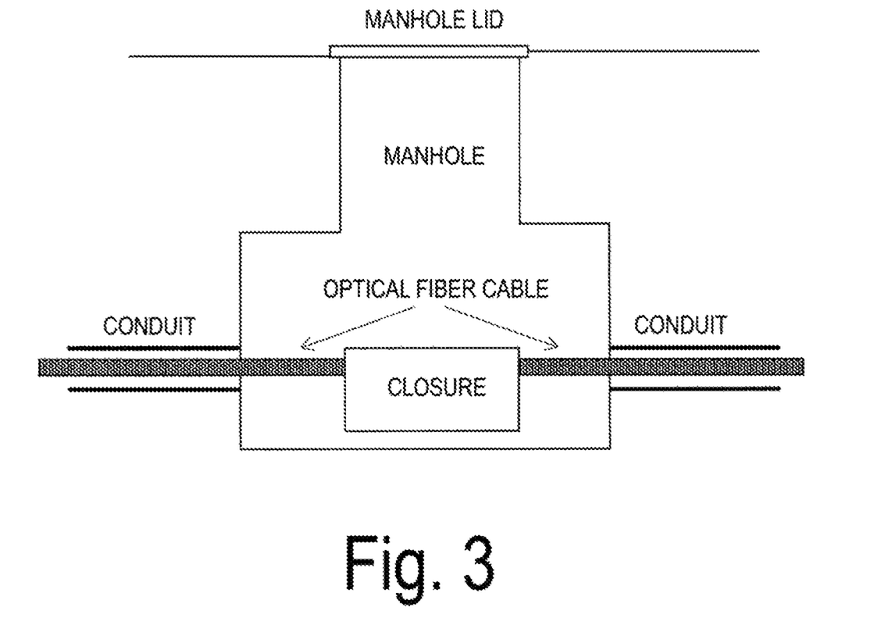
FIG. 3 is a diagram illustrating a disposition example of a manhole and a closure.

As illustrated in FIG. 3, the optical fiber cable can sometimes be installed in an underground section. In such a section, water may penetrate into the closure due to rainwater flowing into a manhole or the like, and the mechanical reliability of the optical fiber may be reduced. Thus, a water penetration detection module as shown in Non Patent Literature 1 is utilized to detect the presence or absence of water penetration inside the closure. The water penetration detection module is attached to the optical fiber core, and when water penetration occurs, an internal member expands and bends the optical fiber to cause a loss. This loss can be detected by using an optical time-domain reflection measurement and it is possible to find water penetration into the closure.

CITATION LIST

Non Patent Literature

Non Patent Literature 1: Watanabe et al., "Optical Line testing system using fiber selector for small buildings", NTT Technical Journal, 2008.12

Non Patent Literature 2: Nakamura et al., "High-sensitive detection of fiber bending using 1 μm bandwidth mode detection OTDR", IEICE Technical Report, OFT 2014-18, 2014

Non Patent Literature 3: Ohno et al., "Industrial applications of the BOTDR optical fiber strain sensor", Optical Fiber Technology, vol. 7, pp. 45-64, 2001

Non Patent Literature 4: Horiguchi et al., "BOTDA-nondestructive measurement of single-mode optical fiber attendant characteristics using Brillouin interaction: The Journal of the Association of the Journal of the National Health Insurance, The Journal of the Association of New Zealand and the United States." 7, no. 8, pp. 1170-1176, 1989

SUMMARY OF THE INVENTION

Technical Problem

Figure 4:
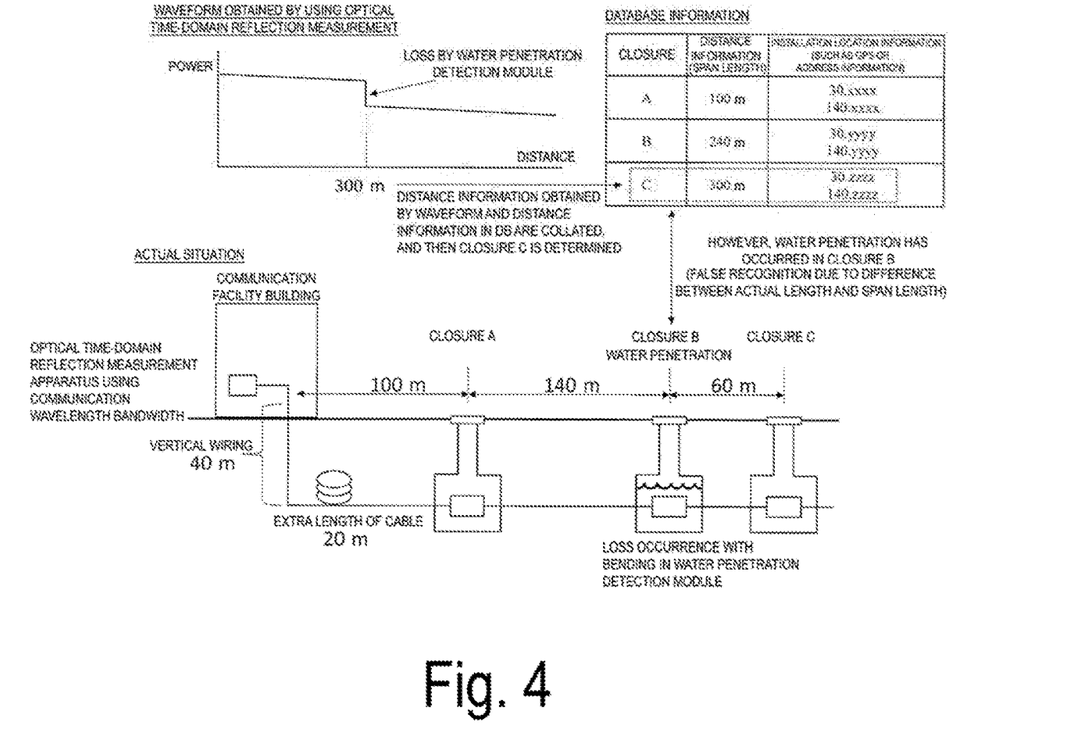
FIG. 4 is a diagram illustrating a problem of the present disclosure.

It is necessary to go to the installation site of the closure for recovery work when water penetration is detected. This time, as illustrated in FIG. 4, a distance to a loss occurrence site is confirmed using a waveform of the optical time-domain reflection measurement, the distance to the loss occurrence site and a database (DB) storing information about distance to the closure are collated, and the site where the closure is installed is specified. However, the information about the distance to the loss occurrence site obtained from the measurement result may not match the information about the distance to the closure stored in the DB.

This is because the information about the distance to the loss occurrence site obtained from the result of the optical time-domain reflection measurement is the length of the optical fiber core itself, that is, the actual length while the information about the distance to the closure stored in the DB is the horizontal distance of the optical cable route, that is, the span length. When vertical wiring is installed in a communication facility building, the actual length may increase accordingly. A difference between the actual length and the span length also occurs due to the accumulation of the extra length of the cable secured for the cable management or the extra length of the optical fiber core at the connection point, or meandering of the cable.

As a result, a situation may occur where a closure having the same distance information as the loss occurrence distance obtained by using the measurement does not exist in the DB or has the same value as the distance information of another adjacent closure so that the loss occurrence site is erroneously recognized. In the former case, it is necessary to go to the site without specifying the location of the closure and inspect the suspected closures one by one, which takes an extremely long time. Further, in the latter case, a user realizes that they have visited the wrong closure for the first time at the site, which is redundant and inefficient. Further, since the closure is installed in the manhole and the work requires extensive operations such as acquiring permission to use the road and dispatching watchmen, specific operations conducted by means of process of elimination and redundant operations as described above, generate a large cost.

This is caused by the fact that the information contents are essentially different, such that the information obtained from the measurement result is the actual length, whereas the information stored in the DB is the span length. As described above, in the related art, there are problems that the site where the loss increment occurred and the information about the closure stored in the DB are not correctly associated with each other, or the loss occurrence location of the optical fiber cable is not accurately specified, and inefficient and uneconomic work occurs.

An object of the present disclosure is to provide an optical fiber cable monitoring method and an optical fiber cable monitoring system for linking information obtained from a measurement result with information stored in a DB to accurately specify a loss occurrence location of an optical fiber cable, in order to solve the above problems.

Means for Solving the Problem

To achieve the above object, an optical fiber cable monitoring method according to the present disclosure acquires a location of a closure on an optical fiber cable in advance, and links information stored in a DB with information (location on the optical fiber cable) obtained from a measurement result in the arrangement order of the closures.

Specifically, an optical fiber cable monitoring method according to the present disclosure is an optical fiber cable monitoring method for monitoring a plurality of specific points arranged in a length direction on an optical fiber cable, the optical fiber cable monitoring method includes:

acquiring, by an optical measurement in which information about a distance of the optical fiber cable is acquired by propagating a measuring light, distance information of the specific points on the optical fiber cable;

linking, by using an arrangement order of the specific points and geographical location information acquired in advance, the geographical location information with the distance information of the specific points for each of the specific points based on the arrangement order of the specific points;

abnormality-detecting, by an optical monitoring having lower sensitivity than the optical measurement, in which information about a distance of the optical fiber cable is acquired by propagating a monitoring-light, distance information on the optical fiber cable about a point of abnormality that occurs in the optical fiber cable; and acquiring, by using the geographical location information and the distance information of the specific points that are linked in the linking step, the geographical location information about the specific point corresponding to the point of abnormality based on the distance information about the point of abnormality detected in the abnormality-detecting step.

An optical fiber cable monitoring system according to the present disclosure is an optical fiber cable monitoring system for monitoring a plurality of specific points arranged in a length direction on an optical fiber cable, the optical fiber cable monitoring system includes:

a distance information acquisition unit configured to acquire, by an optical measurement in which information about a distance of the optical fiber cable is acquired by propagating a measuring-light, distance information of the specific points on the optical fiber cable;

a linkage unit configured to link, by using an arrangement order of the specific points and geographical location information acquired in advance, the geographical location information with the distance information of the specific points for each of the specific points based on the arrangement order of the specific points;

an abnormality detection unit configured to detect, by an optical monitoring having lower sensitivity than the optical measurement, in which information about a distance of the optical fiber cable is acquired by propagating a monitoring-light, distance information on the optical fiber cable about a point of abnormality that occurs in the optical fiber cable; and a location acquisition unit configured to acquire, by using the geographical location information and the distance information of the specific points that are linked in the linking step, the geographical location information about the specific point corresponding to the point of abnormality based on the distance information about the point of abnormality detected in the abnormality detection unit.

The present disclosure uses two types of optical fiber measurement techniques with different sensitivities. Each of closure locations on the optical fiber cable is acquired with a high-sensitivity measurement technique, and geographical location information (information stored in a DB) and the closure locations on the optical fiber are linked to each other in an arrangement order of the closures. Thus, an operator can recognize an actual location (geographical location information) of the closure that is linked to a location of a point of abnormality on the optical fiber cable when an abnormality in the closure (location on the optical fiber cable) is detected with a low-sensitivity measurement technique.

Accordingly, the present disclosure can provide an optical fiber cable monitoring method and an optical fiber cable monitoring system capable of linking information obtained from a measurement result and information stored in a DB to each other and accurately specifying a loss occurrence location on an optical fiber cable.

As a first example of a high-sensitivity measurement method, the optical measurement in the step of acquiring the distance information includes an optical time-domain reflection measurement in which the measuring light is an optical pulse that is less than or equal to a cutoff wavelength of the optical fiber cable, and the specific points are set by an occurrence point at which a loss is detected.

As a second example of the high-sensitivity measurement method, the optical measurement in the step of acquiring the distance information includes an optical time-domain reflection measurement in which, using Brillouin scattering caused by the measuring light, a lengthwise distribution of an amount of Brillouin frequency shift is measured, and the specific points are set by a singular point in the lengthwise distribution.

As a third example of the high-sensitivity measurement method, the optical measurement in the step of acquiring the distance information includes a Brillouin optical time-domain analysis measurement in which, by setting the pump light of the pulse light and the probe light of the continuous light as measuring light, and changing a frequency difference between the pump light and the probe light, a lengthwise distribution of frequency characteristics of a Brillouin gain received by the probe light is measured, and the specific points are set by a singular point of the lengthwise distribution.

The optical fiber cable monitoring method according to the present disclosure may acquire, in the step of acquiring the distance information, the distance information of all the specific points in advance.

Further with regards to the optical fiber cable monitoring method according to the present disclosure, after the distance information about the point of abnormality is acquired in the abnormality-detecting step, it is also acceptable to acquire the distance information of the specific points from an incident end of the measuring light on the optical fiber cable to at least the point of abnormality.

Effects of the Invention

The present disclosure can provide an optical fiber cable monitoring method and an optical fiber cable monitoring system capable of linking information obtained from a measurement result and information stored in a DB to each other and accurately specifying a loss occurrence location on an optical fiber cable.

DESCRIPTION OF EMBODIMENTS

Hereinafter, an embodiment of the present disclosure will be described with reference to the drawings. The embodiment described below is an example of the present disclosure, and the present disclosure is not limited to the following embodiment. Note that in the specification and the drawings, components having the same reference numerals indicate the same components.

Embodiment 1

Figure 5:
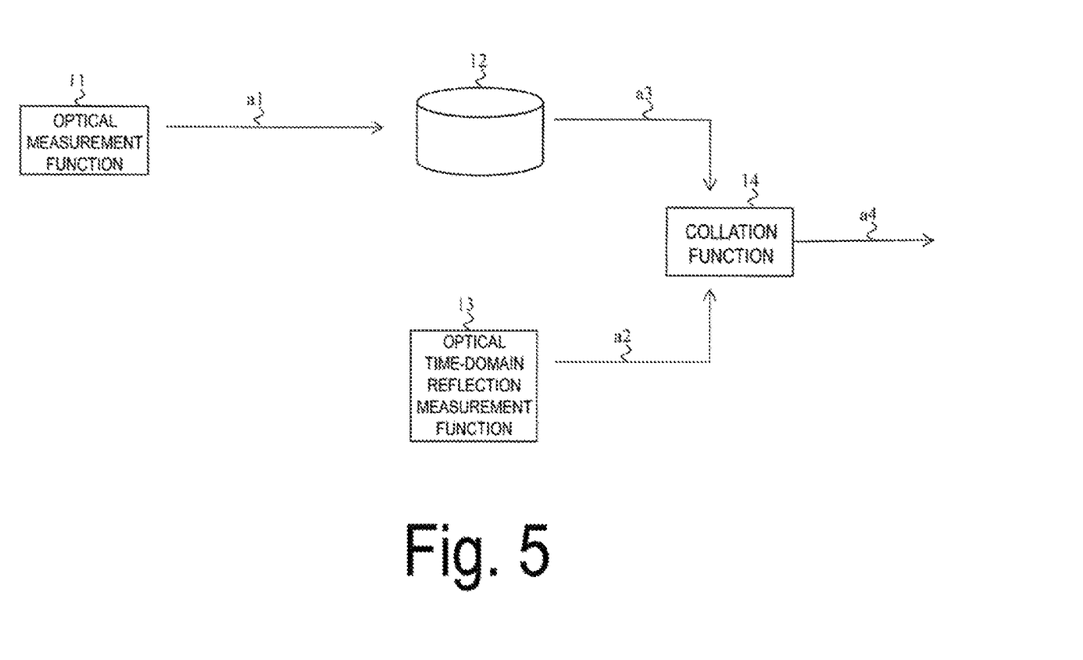
FIG. 5 is a configuration diagram for explaining an optical fiber cable monitoring system according to the present disclosure.

FIG. 5 is a diagram for explaining an optical fiber cable monitoring system according to the present embodiment. An optical fiber cable monitoring system for monitoring a plurality of specific points arranged in a length direction on an optical fiber cable is provided, and the optical fiber cable monitoring system includes:

a distance information acquisition unit configured to acquire, by an optical measurement in which information about a distance of the optical fiber cable is acquired by propagating a measuring-light, distance information of the specific points on the optical fiber cable;

a linkage unit configured to link, by using an arrangement order of the specific points and geographical location information acquired in advance, the geographical location information with the distance information of the specific points for each of the specific points based on the arrangement order of the specific points;

an abnormality detection unit configured to detect, by an optical monitoring having lower sensitivity than the optical measurement, in which information about a distance of the optical fiber cable is acquired by propagating a monitoring-light, distance information on the optical fiber cable about a point of abnormality that occurs in the optical fiber cable; and a location acquisition unit configured to acquire, by using the geographical location information and the distance information of the specific points that are linked in the linking step, the geographical location information about the specific point corresponding to the point of abnormality based on the distance information about the point of abnormality detected in the abnormality detection unit.

An optical measurement function 11 corresponds to the distance information acquisition unit, a database function 12 corresponds to the linkage unit, an optical time-domain reflection measurement function 13 corresponds to the abnormality detection unit, and a collation function 14 corresponds to the location acquisition unit. The optical measurement function 11 outputs obtained actual length information a1 to each closure. The database function 12 stores closure distance information (span length) and geographical location information, and receives the actual length information a1 as needed and adds the actual length information a1 to the database. The optical time-domain reflection measurement function 13 measures a loss (water penetration in the closure) occurring on the optical fiber cable in the length direction using a communication wavelength bandwidth, and specifies the location. The optical time-domain reflection measurement function 13 outputs an actual length information a2 about the water penetration location obtained from the measurement result. The database function 12 outputs the closure distance information (actual length, span length) and the geographical location information a3 stored in the database. The collation function 14 collates the information a2 with the information a3 and outputs the geographical location information about the water penetrated closure a4.

The present optical fiber cable monitoring system performs the following optical fiber cable monitoring method. An optical fiber cable monitoring method for monitoring a plurality of specific points arranged in a length direction on an optical fiber cable is provided, and the optical fiber cable monitoring method includes:

a distance information acquisition step of acquiring, in an optical measurement in which information about a distance of the optical fiber cable is acquired by propagating a measuring light, distance information of the specific points on the optical fiber cable;

a linkage step of linking, by using an arrangement order of the specific points and geographical location information acquired in advance, the geographical location information with the distance information of the specific points for each of the specific points based on arrangement order of the specific points;

an abnormality detection step of detecting, by an optical monitoring having lower sensitivity than the optical measurement, in which information about a distance of the optical fiber cable is acquired by propagating a monitoring-light, distance information on the optical fiber cable about a point of abnormality that occurs in the optical fiber cable; and a location acquisition step of acquiring, by using the geographical location information and the distance information of the specific points that are linked in the linking step, the geographical location information about the specific point corresponding to the point of abnormality based on the distance information about the point of abnormality detected in the abnormality detection step.

Figure 6:
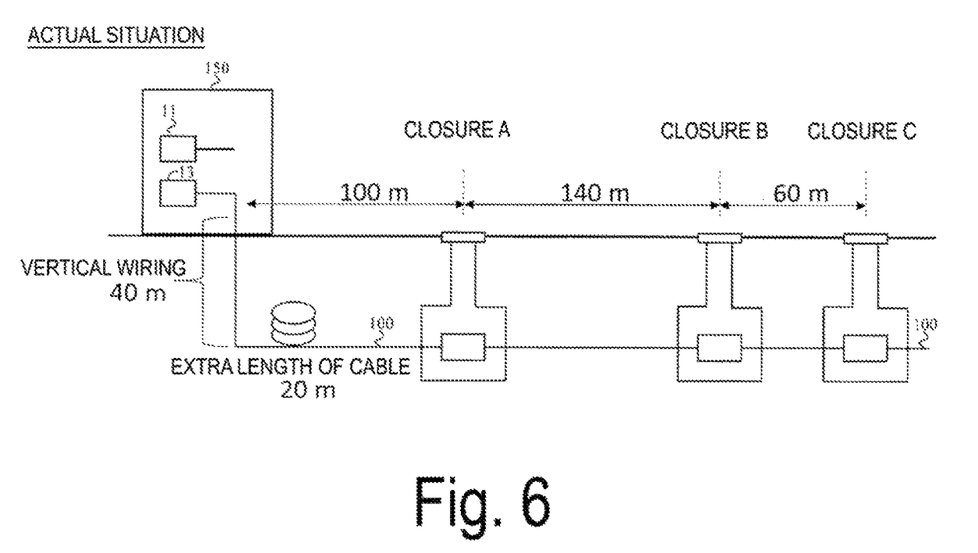
FIG. 6 is a diagram illustrating an example of an optical communication system in which an optical fiber cable is installed.

First, as illustrated in FIG. 6, optical measurement for finding installation distances of all closures arranged on the optical fiber cable 100 to be monitored by the optical measurement function 11 is performed from a communication facility building 150. While the closure has an accommodation portion for a connection point and an extra length of the optical fiber core that has a shallow bend, the connection point and the extra length of the optical fiber core are constructed so that a large optical loss does not occur in a normal communication wavelength bandwidth (from O bandwidth to U bandwidth). For this reason, a clear change in a measurement waveform does not occur with the optical time-domain reflection measurement method using the communication wavelength bandwidth performed by the optical time-domain reflection measurement function 13, and the distance of the closure cannot be specified. Thus, the connection point and a shallow bend existing inside the closure are detected in another manner.

As a method for achieving this, for example, an optical time-domain reflection measurement method using a higher-order mode described in Non Patent Literature 2 is used. That is, the optical measurement in the distance information acquisition step is an optical time-domain reflection measurement in which an optical pulse that is less than or equal to a cutoff wavelength of the optical fiber cable is used as the measured light, and an occurrence point at which a loss is detected is considered to be the specific point. In this method, by setting the measurement wavelength to be less than or equal to the cutoff wavelength of the optical fiber cable to be measured, a higher-order mode that has extremely high-sensitivity with respect to connection loss and bending loss is generated in the optical fiber and its behavior can be measured, and thus, it is possible to detect a connection point and bending that cannot be detected with the optical time-domain reflection measurement using the communication wavelength bandwidth in the related art. Specifically, the measurement is performed by changing the connection of the optical fiber cable 100 from the optical time-domain reflection measurement function 13 to the optical measurement function 11.

Figure 7:
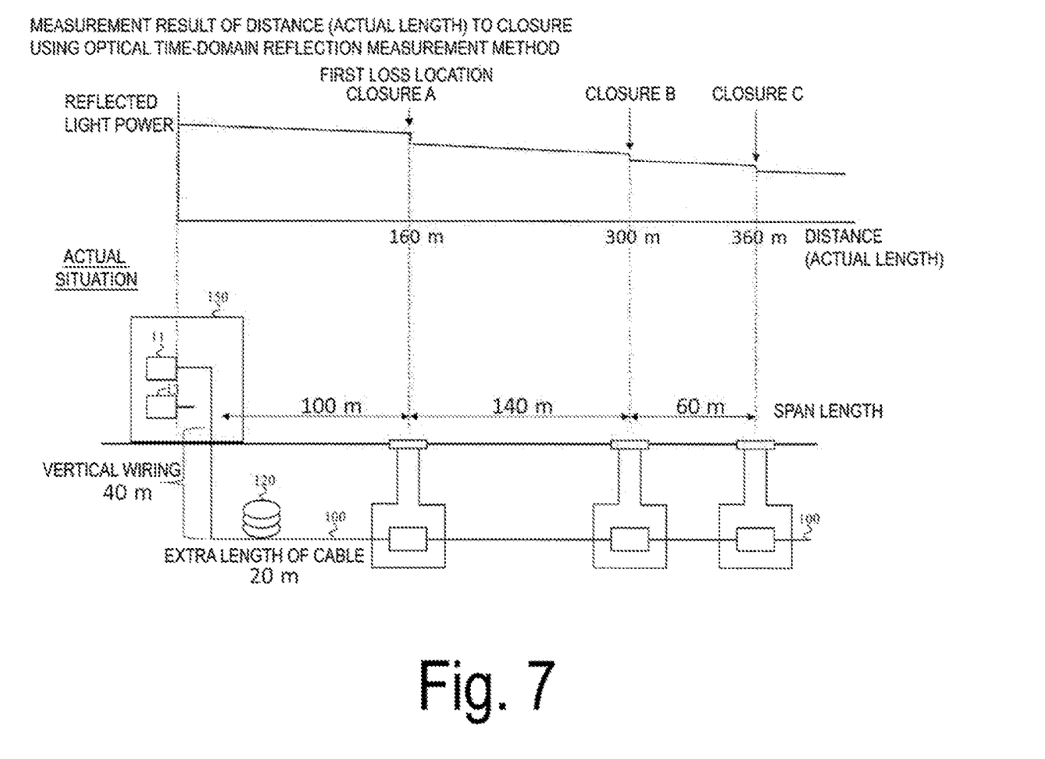
FIG. 7 is a diagram for explaining an optical fiber cable monitoring method according to the present disclosure.

FIG. 7 is an example of a measurement result of distances (actual length) to the closures by using an optical time-domain reflection measurement method that uses a higher-order mode performed by the optical measurement function 11. Loss is detected at distances of 160 m, 300 m, and 360 m in actual length. These are caused by connection loss and bending due to extra length accommodation inside the closure, and thus it can be considered that the closure is installed at that distance.

In general, the bending loss increases as the wavelength increases. Thus, there is a concern that a bending part 120 other than the closure part, which is formed by the routing of the optical fiber cable existing on the optical fiber cable route, is erroneously detected when a wavelength which has a high sensitivity (loss occurrence increases) with respect to bending radius that is larger than the maximum bending radius allowed when accommodating extra length of fiber inside the closure, is selected as a test wavelength used in the optical time-domain reflection measurement using higher-order modes.

Therefore, the test wavelength output by the optical measurement function 11 is less than or equal to the cutoff wavelength of the optical fiber or optical fiber cable to be measured for higher-order mode operation, and it is desirable to choose a high sensitivity, i.e., a wavelength that is lost (a wavelength that does not cause loss in the bending part 120) that is sensitive to less than or equal to the maximum bending radius that is allowed during accommodation of the fiber excess length within the closure.

Figure 8:
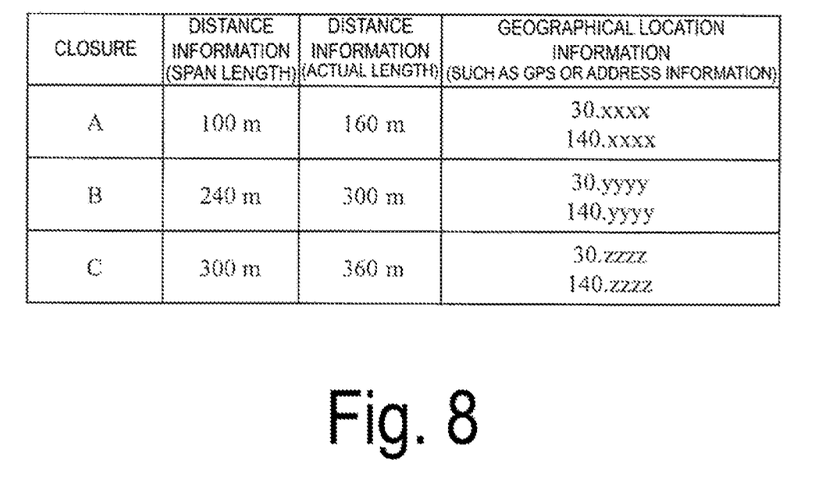
FIG. 8 is a diagram showing an example of information linked using the optical fiber cable monitoring method according to the present disclosure.

FIG. 8 is a diagram for explaining a database stored in the database function 12. In addition to the pre-input information about a distance (span length) to each closure and geographical location information, the database function 12 stores information about the actual length to each closure measured by the optical measurement function 11 in a database. The order of closure installation on the optical fiber cable from the communication facility building can be known from the distance information (span length) about the closure in the DB. In this example, closures are installed in the order of A, B, and C.

Accordingly, the first loss location in FIG. 7 corresponds to the closure A, and the actual length is 160 m. Similarly, closures B and C are 300 m and 360 m, respectively. The database function 12 stores the information about the actual length to each closure determined in this way in the DB. As described above, the database function 12 grasps the actual lengths of all the closures on the optical fiber cable detected by the optical measurement function 11, and adds the actual length information as distance information of each closure on the DB based on the known order of closure installations from the span length information.

The distance information of all the specific points (closures) may be acquired in the distance information acquisition step before water penetration occurs in the closure.

Figure 9:
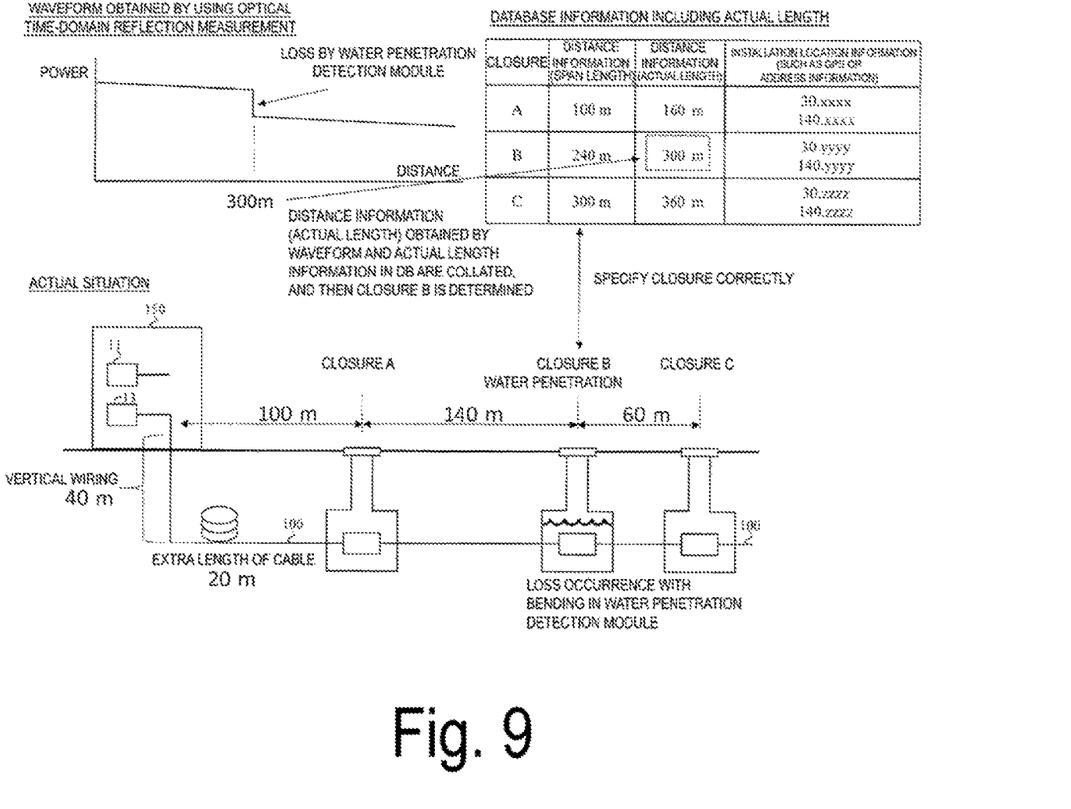
FIG. 9 is a diagram for explaining the optical fiber cable monitoring method according to the present disclosure.

For example, it is assumed that the water penetration occurs in the closure B as illustrated in FIG. 9. The optical time-domain reflection measurement function 13 detects a loss, that is, water penetration, at a distance of 300 m. The collation function 14 collates and compares the distance information (actual length) of the loss occurrence location detected by the optical time-domain reflection measurement function 13 with the DB information including the actual length stored by the database function 12, and specifies that the closure in which the water penetration occurred is B. The installation location information about the closure B is stored in advance in the DB based on GPS information, address information, or the like, and thus an operator can specify the installation location of the closure where the water penetration occurred with no mistakes, and can quickly and accurately go to the site and work.

Embodiment 2

In the present embodiment, a case will be described where the optical measurement in the distance information acquisition step is an optical time-domain reflection measurement in which using Brillouin scattering caused by the measuring light, a lengthwise distribution of an amount of Brillouin frequency shift is measured, and the specific points are set by a singular point in the lengthwise distribution.

The optical measurement function 11 may obtain the information a1 by observing Brillouin scattered light using the optical time-domain reflection measurement (Non Patent Literature 3). The frequency of the Brillouin scattered light shifts due to the strain generated in the extra length accommodation portion of the optical fiber inside the closure and the difference in Brillouin scattering characteristics by cause of the difference in the optical fiber before and after the connection point. Thus, the lengthwise distribution of the amount of the Brillouin frequency shift is measured, therefore, it can be considered that the closure is installed at the site where the change has occurred, and the distance to each of the closures, that is, the actual length can be found.

Embodiment 3

In the present embodiment, a case will be described where the optical measurement in the distance information acquisition step is a Brillouin optical time-domain analysis measurement in which, by setting the pump light of the pulse light and the probe light of the continuous light as the measuring light, a lengthwise distribution of frequency characteristics of a Brillouin gain received by the probe light is measured, and the specific points are set by a singular point of the lengthwise distribution.

The optical measurement function 11 may obtain the information a1 using Brillouin optical time-domain analysis (Non Patent Literature 4). The frequency characteristics of the Brillouin gain change in the length direction due to the strain generated in the extra length accommodation portion of the optical fiber inside the closure and the difference in the optical fiber before and after the connection point. Thus, the lengthwise distribution of the frequency characteristics of the Brillouin gain is measured, thereby, it can be considered that the closure is installed at the site where the change has occurred, and the distance to each of the closures, that is, the actual length can be found.

Embodiment 4

In the present embodiment, a case will be described where after the distance information about the point of abnormality is acquired in the abnormality detection step, the distance information of the specific points, which is from an incident end of the measuring light on the optical fiber cable at least to the point of abnormality, is acquired in the distance information acquisition step.

The finding of the installation distance (actual length) of the closure by the optical measurement function 11 may be performed after the water penetration is detected by the optical time-domain reflection measurement function 13 using the communication wavelength bandwidth. In this case, at least the installation distance information of the closure installed up to the water penetration detection site may be obtained. Thereby, it is clear which closure is installed on the optical fiber cable at the site where the water penetration is detected so that it can be linked to the closure information about the database, and the location of the water penetrated closure can be specified accurately.

Other Embodiment

Note that the present disclosure is not limited to the above-described embodiment examples as they are, and can be embodied by modifying constituent elements in an implementation stage without departing from the scope of the disclosure. In addition, various disclosures can be formed by appropriately combining a plurality of constituent elements disclosed in the above embodiments. For example, some components may be deleted from all the components shown in the embodiment. Further, components of different embodiments may be appropriately combined.

APPENDIX

The following describes the optical fiber cable monitoring method of the present embodiment.

Problem

Information about a distance to a loss occurrence site obtained from the result of the time-domain reflection measurement performed in a normal inspection of an optical fiber cable is a length of an optical fiber core itself, but information about a distance to a closure stored in the equipment DB is the horizontal distance of the optical cable route, and there may be a case where the water penetrated closure is erroneously recognized.

In the present optical fiber cable monitoring method, a plurality of closures accommodating connection points that connect optical fibers within an optical fiber cable and an extra length of optical fibers required for a connection work are installed on an optical fiber cable route, and a loss occurring at a site of the closures is monitored by finding a loss distribution of the optical fiber cable in a length direction by using a first optical time-domain reflection measurement that uses a wavelength included in an O to U bandwidth as a test light wavelength, and the optical fiber cable monitoring method including:

finding in advance information about a location of where the closure is installed;

finding in advance an arrangement order of the closure installed on the optical fiber cable route;

finding information about a distance to the closure installed on the optical fiber cable route by using an optical measurement as an actual length, that is, a length of the optical fiber to the closures;

collating a loss distribution waveform in which a loss is detected with monitoring by using the first optical time-domain reflection measurement method with actual length distance information of a closure obtained by the optical measurement, and counting an order in which the site where the loss is detected corresponds to the closures on the route; and specifying an installation location of the closure where the loss occurred by collating the arrangement order of the closures installed on the optical fiber route found in advance and the installation location information about each closure.

By using the present optical fiber cable monitoring method, the location of the closure from a communication facility building can be easily and accurately found only by performing the optical measurement, and efficient and economical work becomes possible.

REFERENCE SIGNS LIST

11 optical measurement function
12 database function
13: optical time-domain reflection measurement function
14 collation function
100 optical fiber cable
120 bending part
150 communication facility building

The invention claimed is:

1. An optical fiber cable monitoring method for monitoring a plurality of specific points arranged in a length direction on an optical fiber cable, the optical fiber cable monitoring method comprising:

acquiring, by an optical measurement in which information about a distance of the optical fiber cable is acquired by propagating a measuring light, distance information of the specific points on the optical fiber cable;

linking, by using an arrangement order of the specific points and geographical location information acquired in advance, the geographical location information with the distance information of the specific points for each of the specific points based on the arrangement order of the specific points;

abnormality-detecting, by an optical monitoring having lower sensitivity than the optical measurement, in which information about a distance of the optical fiber cable is acquired by propagating a monitoring-light, distance information on the optical fiber cable about a point of abnormality that occurs, in the optical fiber cable; and acquiring, by using the geographical location information and the distance information of the specific points that are linked in the linking step, the geographical location information about the specific point corresponding to the point of abnormality based on the distance information about the point of abnormality detected in the abnormality-detecting step.

2. The optical fiber cable monitoring method according to claim 1, wherein
the optical measurement in the step of acquiring the distance information is an optical time-domain reflection measurement in which the measuring light is an optical pulse that is less than or equal to a cutoff wavelength of the optical fiber cable, and the specific points are set by an occurrence point at which a loss is detected.

3. The optical fiber cable monitoring method according to claim 1, wherein
the optical measurement in the step of acquiring the distance information is an optical time-domain reflection measurement in which, using Brillouin scattering caused by the measuring light, a lengthwise distribution of an amount of Brillouin frequency shift is measured, and the specific points are set by a singular point in the lengthwise distribution.

4. The optical fiber cable monitoring method according to claim 1, wherein
the optical measurement in the step of acquiring the distance information is a Brillouin optical time-domain analysis measurement in which, by setting pump light of pulse light and probe light of continuous light as the measuring light, and changing a frequency difference between the pump light and the probe light, a lengthwise distribution of frequency characteristics of a Brillouin gain received by the probe light is measured, and the specific points are set by a singular point of the lengthwise distribution.

5. The optical fiber cable monitoring method according to claim 1,
wherein in the step of acquiring the distance information, the distance information of all the specific points is acquired.

6. The optical fiber cable monitoring method according to claim 1,
wherein, after the distance information about the point of abnormality is acquired in the abnormality-detecting step, the distance information of the specific points, which is from an incident end of the measuring light on the optical fiber cable at least to the point of abnormality, is acquired in the step of acquiring the distance information.

* * * * *